(No Model.)

J. H. PITKIN.
HARVESTER ELEVATOR.

No. 476,302. Patented June 7, 1892.

Witnesses
Arthur Johnson
Elise M. Halverson.

Inventor.
Julian H. Pitkin

THE NORRIS PETERS CO., PHOTO-LITHO., WASHINGTON, D. C.

UNITED STATES PATENT OFFICE.

JULIAN H. PITKIN, OF CHICAGO, ILLINOIS.

HARVESTER-ELEVATOR.

SPECIFICATION forming part of Letters Patent No. 476,302, dated June 7, 1892.

Application filed January 13, 1892. Serial No. 417,975. (No model.)

*To all whom it may concern:*

Be it known that I, JULIAN H. PITKIN, of Chicago, in the county of Cook and State of Illinois, have invented certain new and useful Improvements in Harvester-Elevators, of which the following is a full description, reference being had to the accompanying drawings, in which—

Figure 1:
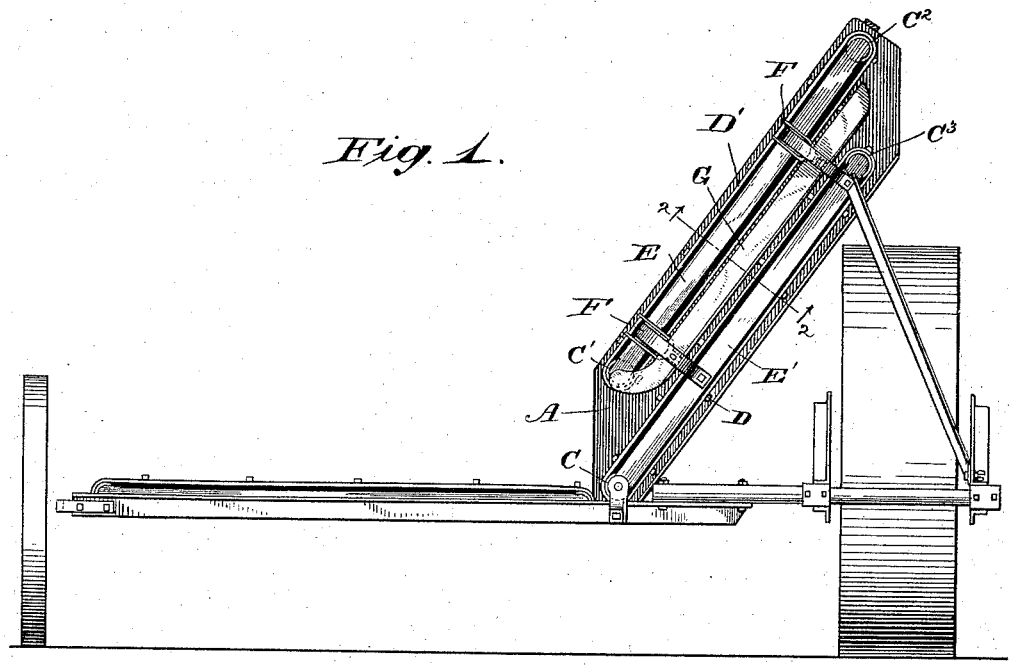
Figure 2:
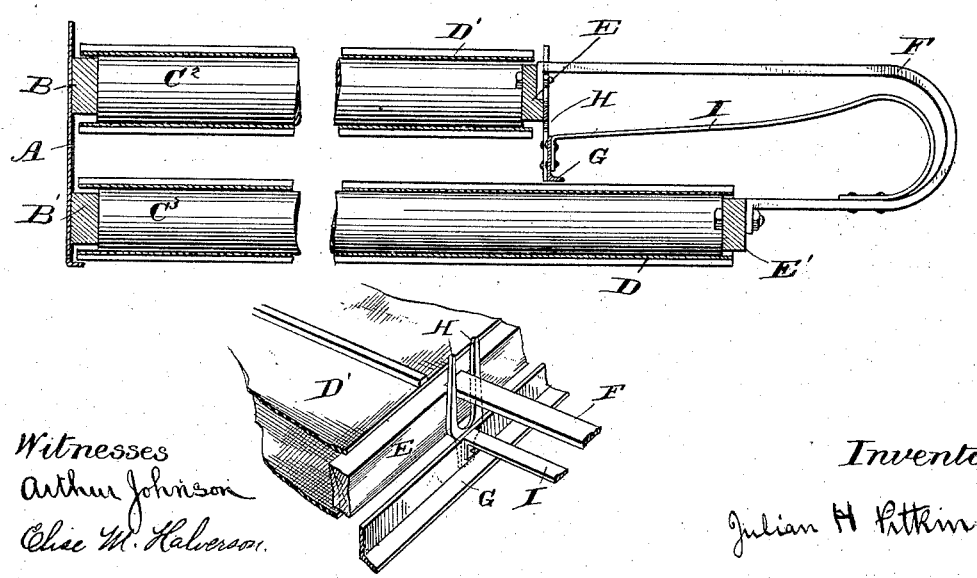

Figure 1 is a rear elevation of an ordinary harvesting-machine with my improvement attached. Fig. 2 is a transverse section of the elevating devices as if cut on the line 2 2 of Fig. 1.

Heretofore the majority of harvesting-machines have been provided with elevating-canvases or other elevating devices of width fore and aft equal to the longest grain desired to cut; but such width necessarily makes the machine large and heavy. Efforts have been made to narrow the elevating devices by making them open at the rear end, so that the heads may project rearward; but such efforts have been only partly successful, because the heads left free no contact with elevating-canvases sufficient to prevent them from sagging back has been attained, and in that condition of grain in which the butts are heavy and the straw near the heads light the butts have been carried upward and the heads left behind.

The object of my invention is to provide an elastic slide adapted to force the grain positively against one of the elevating-canvases, preferably at some distance behind the center of gravity of the longest straws.

In the drawings the harvester-frame is mounted upon ordinary supporting-wheels and the front elevator-frame A properly footed thereon. To it are secured the canvas slides B and B' and the rollers C, C', C², and C³, journaled therein. I make the lowermost elevating-canvas D sufficiently wide to lie under nearly the whole length of the straw to be elevated, but reduce the width of the upper one D' considerably and support its rollers in a slide E and the rollers of the elevating-canvas D in the slide E'. The slides E and E' are connected by the arches F. In rear of the slide E, I place a sled-runner-shaped guide G, the curved portion being at the receiving end of the elevator. In order to hold the guide elastically, so as to press upon the grain sliding under it, I provide the springs I, preferably secured, as shown, to G and to the supports F. Pieces H, forked so as to engage the arches F, serve to prevent any displacement of the said guide G.

I do not limit myself to the placement of the guide-piece G at the immediate rear of the elevating-canvas D', as it is obvious that it will accomplish its work if a considerable deviation from that position be made.

What I claim as my invention, and desire to secure by Letters Patent, is—

1. The combination, with the endless elevating devices rigidly secured relative to each other, of the guide G, elastically held relative to the said elevating devices, whereby the said guide may yield away from the surface of the lowermost elevating device, substantially as described.

2. The combination, with the elevating-canvases fixed relative to each other, of the guide G, elastically held relative to the said elevating devices and permitted to rise and fall relative to the lowermost elevating-canvas and permit the masses of long grain carried by the said lowermost elevating-canvas to pass thereunder, substantially as described.

3. The combination, with the elevating-canvases fixed relative to each other, of the guide G, lying against the support and secured to the frame-work of the uppermost elevating device by bolts through the slotted holes to prevent displacement, and the spring I, adapted to hold the guide down to the lowermost elevating-canvas, substantially as described.

JULIAN H. PITKIN.

Witnesses:
 ARTHUR JOHNSON,
 ELISE M. HALVERSON.